United States Patent [19]

Belinkoff

[11] 4,113,188

[45] Sep. 12, 1978

[54] FOOD PROCESSOR

[75] Inventor: Irving R. Belinkoff, Queens Village, N.Y.

[73] Assignee: Kidde Consumer Durables Corp., Bala Cynwyd, Pa.

[21] Appl. No.: 790,509

[22] Filed: Apr. 25, 1977

[51] Int. Cl.² .............................................. B02C 18/12
[52] U.S. Cl. ...................................... 241/37.5; 241/92; 241/282.1
[58] Field of Search ............. 241/36, 37.5, 92, 199.12, 241/282.1, 282.2

[56] References Cited

U.S. PATENT DOCUMENTS

| | | | |
|---|---|---|---|
| 2,982,483 | 5/1961 | Heinemans | 241/36 X |
| 3,024,010 | 3/1962 | Sperling | 241/282.1 UX |
| 3,220,450 | 11/1965 | Aronson et al. | 241/199.12 |
| 3,434,518 | 3/1969 | Motis | 241/199.12 |
| 3,493,022 | 2/1970 | Mantelet | 241/199.12 |
| 3,612,414 | 10/1971 | Nevison | 241/36 |
| 3,892,365 | 7/1975 | Verdun | 241/92 |

Primary Examiner—Howard N. Goldberg
Attorney, Agent, or Firm—Seidel, Gonda & Goldhammer

[57] ABSTRACT

The food processor includes a housing having a motor chamber disposed alongside of a food processing bowl thereby materially decreasing the overall height of the apparatus. A lid is removably attached to the bowl and when properly in position, actuates a motor control switch on the housing whereby the motor may rotate a tool disposed within the bowl. The bowl is removable for purposes of washing the same.

11 Claims, 9 Drawing Figures

FOOD PROCESSOR

BACKGROUND

It is believed that apparatus of the type involved herein is classifiable in class 241-92. The most relevant U.S. patents dealing with the general subject matter involved herein and known to the applicant are U.S. Pat. Nos: 1,480,914; 2,028,595; 2,246,054; 2,590,909; 2,856,974; 2,894,551; 3,137,333; 3,139,917; 3,461,933; 3,493,022; 3,528,469; 3,612,125; 3,612,126; 3,612,414; 3,809,325; 3,892,365; and 3,970,258.

The following French patents are also relevant prior art: 1,201,685; 1,376,979 together with first, second and third editions thereto and 1,382,836.

The food processor of the present invention is an improvement over the prior art and overcomes various problems or deficiencies in the prior art devices so as to decrease weight, lower the center of gravity for more stability, improved safety, ease of manufacture, etc.

SUMMARY OF THE INVENTION

The food processor of the present invention includes a housing having a platform adjacent the lower end thereof. An electrical motor is supported in a motor chamber within the housing. The motor is disposed at an elevation above the elevation of said platform. A drive spindle is supported by the platform and projects thereabove. A means is provided interconnecting the motor and said spindle so that the motor drives said spindle.

A bowl is removably supported upon the platform alongside the portion of the housing containing said motor. The bowl has a centrally located, upwardly extending boss surrounding said spindle. Cooperating members are provided on the bowl and platform for registering the bowl in a predetermined, locked position relative to the housing. A lid is removably attached to the bowl. A motor control switch on said housing is provided adjacent the elevation of said lid for actuation by said lid when said bowl is locked in a properly registered position.

It is an object of the present invention to provide a novel food processor which has a lower center of gravity and lower height as compared with prior devices while being structurally interrelated in a manner which simplifies assembly, minimizes cost, while providing a reliable apparatus.

Other objects will appear hereinafter.

For the purpose of illustrating the invention, there is shown in the drawings a form which is presently preferred; it being understood, however, that this invention is not limited to the precise arrangements and instrumentalities shown.

FIG. 5 is a sectional view taken along the line 5—5 in FIG. 3.

Figure 1:
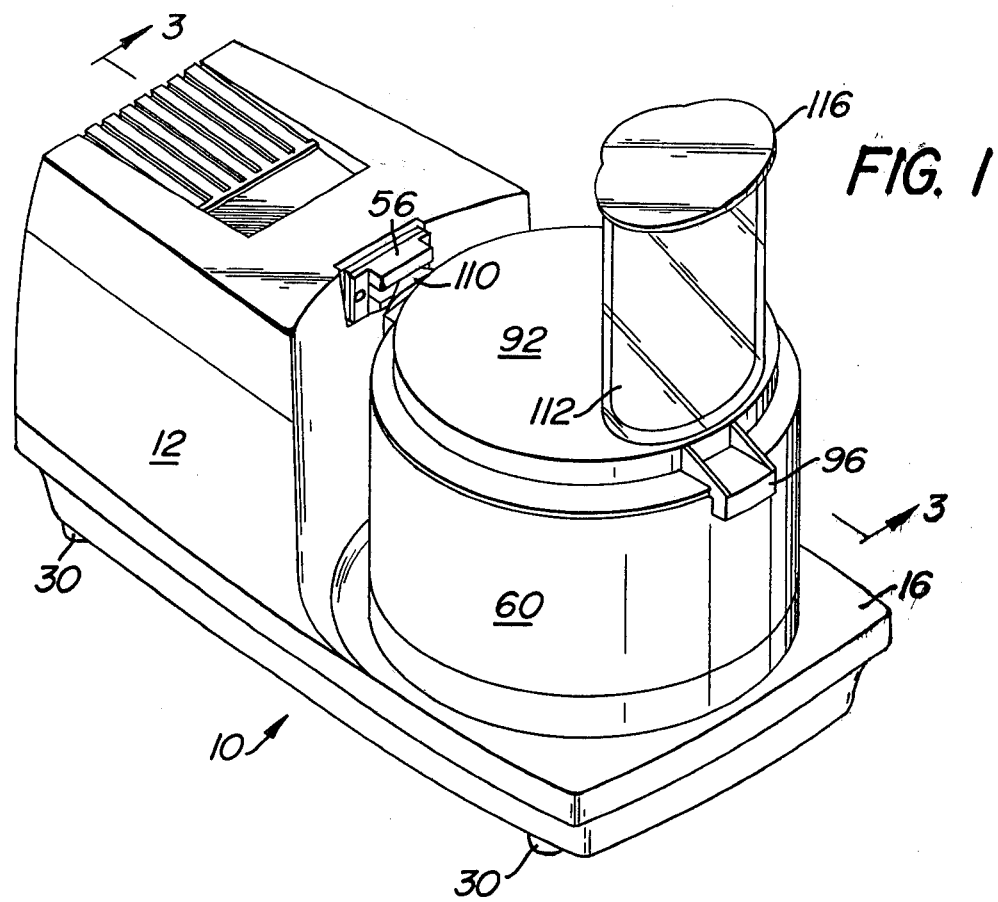
FIG. 1 is a perspective view of apparatus in accordance with the present invention.

Referring to the drawing in detail, wherein like numerals indicated like elements, there is shown a food processor apparatus in accordance with the present invention designated 10.

Figure 3:
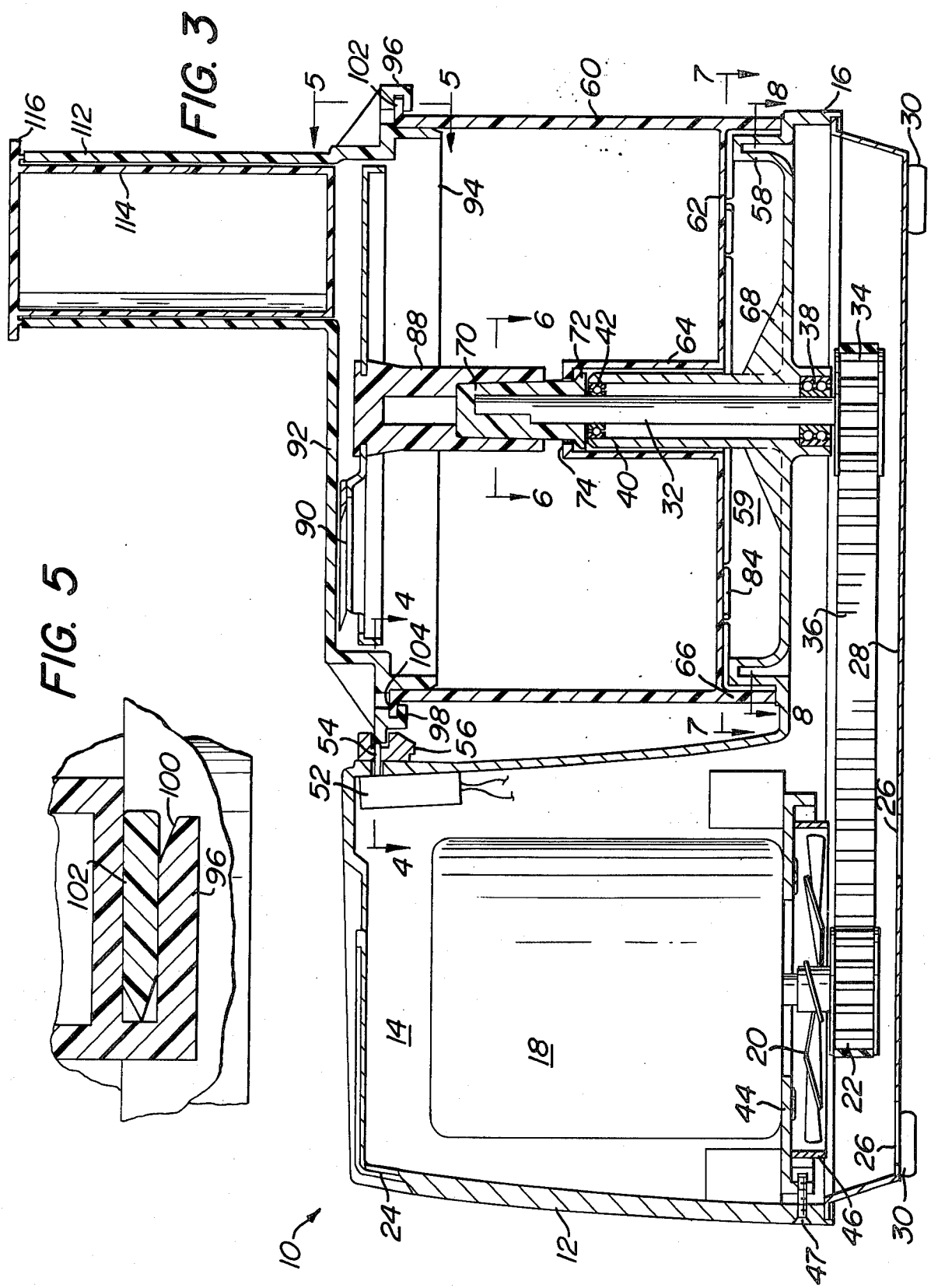
FIG. 3 is a sectional view taken along the line 3—3 in FIG. 1.

The apparatus 10 includes a one piece housing 12 having a flat top wall. Housing 12 is preferably made from a tough rigid polymeric plastic material capable of being moulded such as a polycarbonate. Within housing 12, there is provided a motor chamber 14. An extension 16 is integral in one piece with and extends from the lower end of the housing 12. An AC synchronous heavy duty motor 18 is supported within the chamber 14 and is shown more clearly in FIG. 3.

The motor 18 has an output shaft provided with a blower 20 and terminating in a gear or ribbed pulley 22. Chamber 14 has a plurality of air inlet openings 24 adjacent the upper end thereof. The bottom wall 28 of the housing is removably attached thereto and provided with a plurality of outlet openings 26. Thus, when motor 18 is operative, air is forceably caused to flow through the chamber 14 for cooling the motor.

Figure 2:
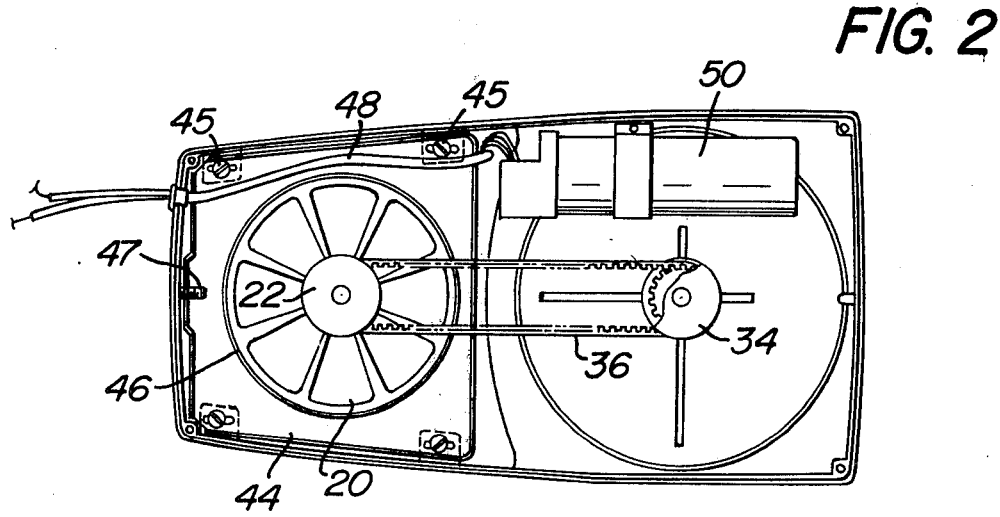
FIG. 2 is a bottom plan view of the apparatus with the bottom cover removed.

The bottom wall 28 is removably secured by threaded fasteners to the bottom of the housing 12, including the platform 16. A bottom plan view of the apparatus is shown in FIG. 2 with the bottom wall 28 removed. The bottom wall 28 is provided with pads 30 for spacing the bottom wall from a support surface such as a table, counter or the like. Pads 30 are made from a highly frictionable material such as rubber so that the apparatus 10 does not creep due to vibration when motor 18 is operative.

A vertically disposed spindle 32 is supported by the platform 16. See FIG. 3. The lower end of the spindle 32 is connected to a gear or ribbed pulley 34. A timing belt 36 or the like extends around members 22 and 34 so that spindle 32 is rotated about its longitudinal axis when motor 18 is operative. The platform 16 includes a vertically disposed boss 40 surrounding spindle 32 and supporting rotary bearings 38, 42. The bearings 38, 42 are adjacent opposite end portions of the spindle 32.

The motor 18 is supported within chamber 14 by means of a mounting plate 44 having a downwardly extending rim 46. Rim 46 surrounds the blades of the blower 20. Plate 44 is adjustably bolted to portions of the housing 12 by way of fasteners 45. See FIG. 2. The fasteners 45 extend through elongated slots in the plate 44. A fastener 47, perpendicular to the longitudinal axis of the output shaft of motor 18, interconnects the housing 12 with the plate 44. Rotation of fastener 47 adjusts the position of the plate 44 thereby increasing or decreasing tension on the belt 36. An electrical conductor 48 extends through a grommet in the housing 12. See FIG. 2. The conductor 48 is connected to a capacitor 50 which in turn is coupled across the field winding of motor 18 to alter the phase and thereby provide for a high starting torque. The conductor 48 is also connected to a motor control switch 52 supported within chamber 14.

The switch 52 is provided with an actuator button or pin 54 which projects through an opening in the housing 12 and into the bottom of a U-shaped channel on a safety guard 56. Motor 18 will remain inoperative until the button or pin 54 is pushed inwardly to close a pair of contacts. This will be discussed in greater detail hereinafter.

The upper surface of the platform 18 includes an annular rim 58 coaxial with the longitudinal axis of spindle 32. See FIG. 3. A removable bowl 60 is provided with a skirt 66 surrounding the rim 58. The upwardly extending boss 64 on the bottom wall 62 of the bowl 60 surrounds the boss 40. The boss 40 is provided with stiffening ribs 68 within the cavity 59 defined by rim 58. Bowl 60 has a uniform circular cross section.

The spindle 32 has an extension 70 provided with vertically disposed splines on its outer peripheral surface and a radially outwardly directed flange 72 on its lower end. The boss 64 has a radially inwardly directed flange 74 which overlies flange 72 and biases it into contact with the upper edge of the boss 40. Hence, food is prevented from contacting spindle 32 or bearing 42. A key provided on the spindle 32 for cooperation with a mating similarly shaped opening in extension 70 so as to prevent relative rotation between spindle 32 and its extension 70.

Figure 9:
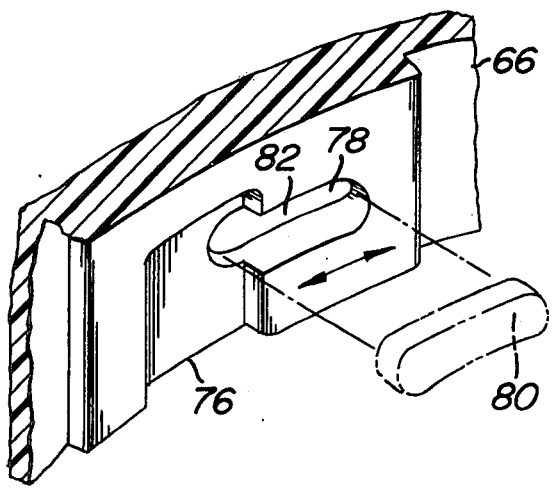
FIG. 9 is a partial perspective view of the lower edge of the bowl on the inner peripheral surface of its skirt.

The bowl 60 by way of its skirt 66 rests on the platform 18 in surrounding relationship to the rim 58. The inner periphery of skirt 66 has a pair of bayonet-type slots. See FIG. 9 which illustrates one such slot 76 extending upwardly from the bottom surface of skirt 60 and coextensive with a circumferentially disposed extension slot 78. The periphery of rim 58 has a pair of circumferential projections 80. Each projection is adapted to be received in one of the slots 76 and then is adapted to enter a slot 78 upon rotation of the bowl 60. Skirt 66 preferably has a hole 82 extending radially therethrough aligned with the slot 78. The slots 76 are diametrically opposite one another when two such slots are provided. Thus, there is only one proper circumferential disposition for the bowl 60 with respect to the platform 18 wherein each projection 80 will enter one of the slots 76 and then after rotation of a few degrees will enable each projection 80 to enter a slot 78.

Figure 7:
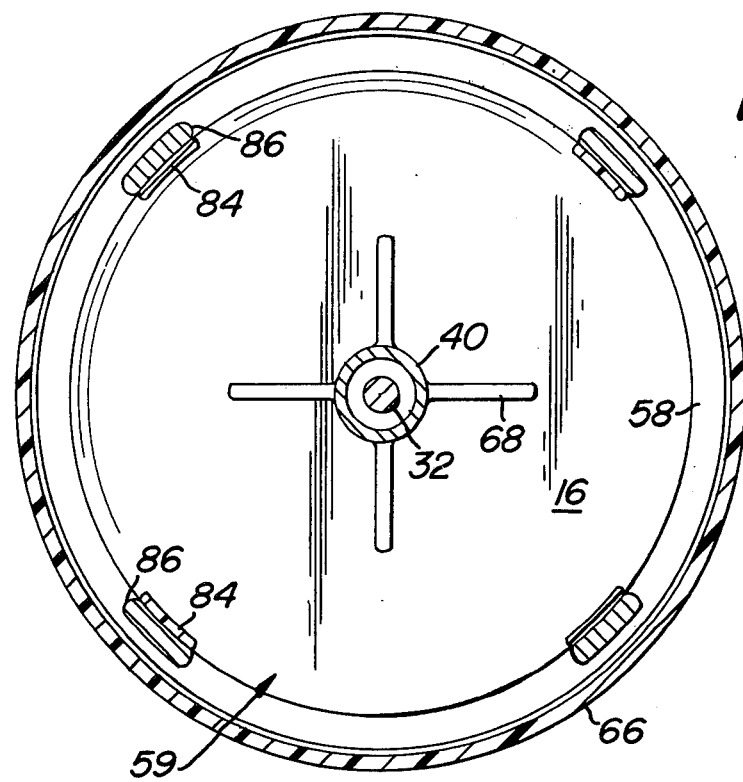
FIG. 7 is a sectional view taken along the line 7—7 in FIG. 3.
Figure 8:
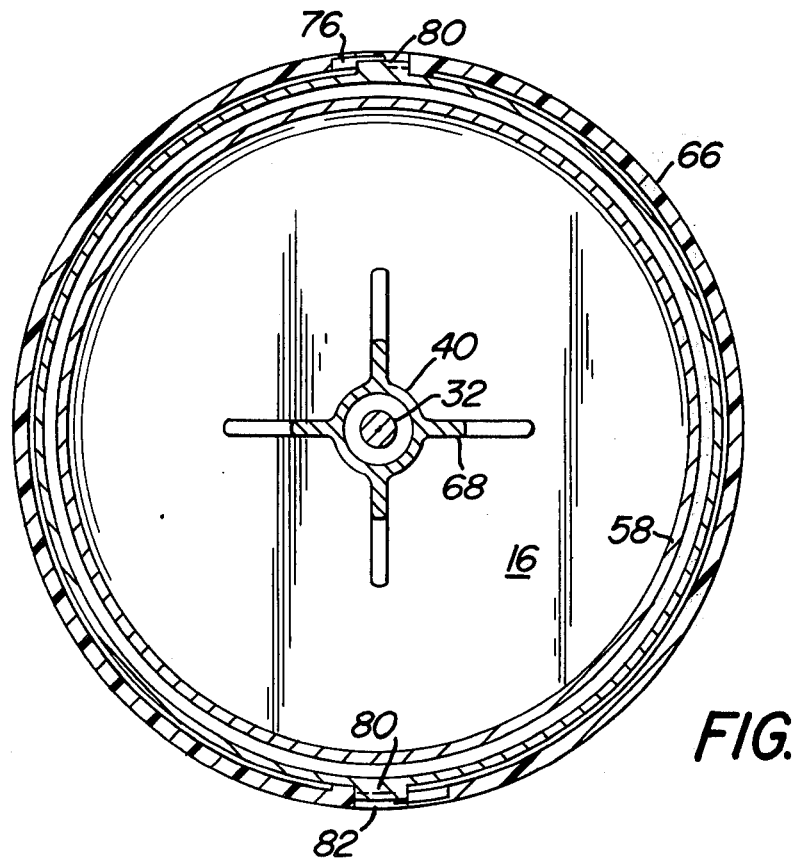
FIG. 8 is a sectional view taken along the line 8—8 in FIG. 3.

The thusly described interrelationship of platform 18 and bowl 60 will result in the bowl being registered in a proper predetermined position for a purpose to be made clear hereinafter. Bowl 60 is preferably made from a transparent tough polymeric plastic material such as the polycarbonate. To assist in maintaining the bowl 60 stationary when properly registered, wall 62 is provided with a plurality of generally arcuately disposed projections 84 each adapted to physically contact an arcuately disposed limit stop 86 with frictional contact. The limit stops 86 are provided on the upper surface of the rim 58. See FIG. 7. Each projection 84 partially overlaps its limit stop 86 when projection 80 is disposed in one of the slots 76.

Figure 6:
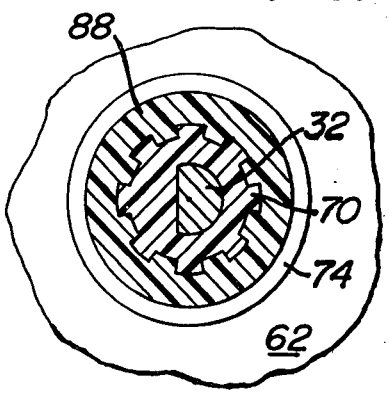
FIG. 6 is a sectional view taken along the line 6—6 in FIG. 3.

A plurality of tools is provided for cutting, mixing, chopping or otherwise working on food which is in the bowl 60. Each tool is used interchangeably with each other, depending upon the food being processed. Each tool includes a hub 88 having splines on its inner surface and adapted to be telescoped onto the extension 70 with the blade 90 extending radially outwardly therefrom. See FIGS. 3 and 6. The elevation of blade 90 on different tools varies.

The bowl 60 is provided with a removeable lid or cover 92 having an annular flange 94 depending therefrom and adapted to be telescoped into the bowl 60. Cover 92 is preferably made from the same material as bowl 60. The cover 92 is provided with a pair of integral channel members 96 and 98 at diametrically opposite locations. The channel members 96, 98 are disposed radially outwardly from the outer periphery of bowl 60. As shown in FIG. 5, each channel member has an inclined cam surface 100 at an open end of the channel, with the opposite end of the channel being closed. The channels preferably open in a counter clockwise direction.

Figure 4:
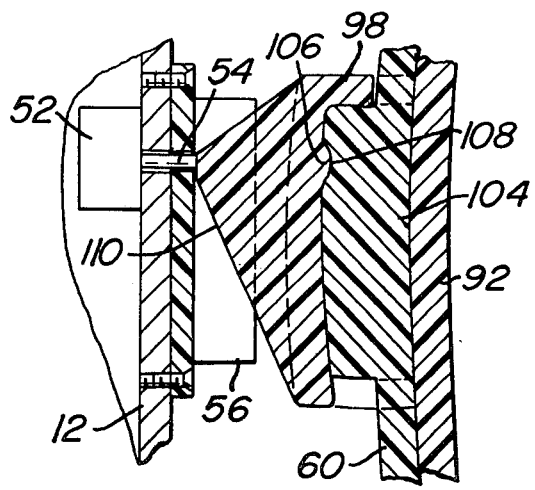
FIG. 4 is a sectional view taken along the line 4—4 in FIG. 3.

Bowl 60 adjacent its upper lip is provided with a pair of radially outwardly directed registration tabs 102, 104. Tab 102 is adapted to enter the channel on member 96 when the cover is properly oriented and registered with the bowl 60. Likewise, tab 104 is adapted to enter the channel on member 98 as shown in FIG. 4. Each of the channel members has a bump 106 adapted to be received in a depression 108 on its associated tab. When the bumps are disposed within their associated depressions, the cover 92 is properly oriented with respect to the bowl and at the same time, a cam 110 projecting radially outwardly from channel member 98 will contact the button or pin 54 and close the switch 52. See FIG. 4. Cam 110 is at a proper elevation so as to pass through the channel of guard 56. When cam 110 is in said channel, guard 56 prevents cover 97 from being lifted up. Until cam 110 contacts and pushes the button or pin 54 into the housing 12, motor 18 will not start. Due to transparency of the materials and the location of cam 110, its coaction with pin 54 is readily visible.

The cover 92 has an upwardly projecting well which is open at both ends and is non-uniform in its peripheral contour. The well 112 is adapted to receive a pusher 114 having a flange 116 which overlies the upper end of well 112. Pusher 114 is preferably a hollow member and facilitates manual introduction of food to be processed while the tool 90 is being driven by the motor 18 without any danger to the user. The non-uniform contour of the well 112 and pusher 114 assures that the pusher will be in a proper position whereby it can only enter the well 112 in one angular orientation. Well 112 can be used as a handle for rotating cover 92 to turn the motor 18 on and off.

In view of the above description and the well-known manner for operating food processors as exhibited by the prior art, a detailed description of operation is not deemed necessary. Except for well 112, on a working embodiment the entire apparatus is less than 8 inches high. By removing the bottom wall 28, one has immediate access to all working parts except switch 52. Hence, assembly and repair are easy and rapid. The flat top wall on housing 12 enables it to be repaired upside down. The one piece housing 12 minimizes cost and facilitates ease of assembly. Any food which escapes from bowl 60 into the space between bosses 40, 64 collects in cavity 59 from which it is readily removed. Food within bowl 60 is prevented from interfering with the mechanical parts of the drive mechanism.

The gourmet cook can use the present invention, by interchanging tools, to chop, grind, slice, shred, grate, mix, puree, etc. various foods including vegetables, meat, fish, nuts, ice, etc.

The present invention may be embodied in other specific forms without departing from the spirit or essential attributes thereof and, accordingly, reference should be made to the appended claims, rather than to the foregoing specification as indicating the scope of the invention.

I claim:

1. A food processor comprising an open bottom housing having an integral platform projecting generally horizontally from a lower end thereof, an electrical motor supported upright in said housing, the upper end of said motor being above the elevation of said platform, an upright drive spindle supported by said platform and projecting thereabove, drive means interconnecting said motor with said spindle, a bowl removably supported on said platform alongside the portion of the housing containing said motor, said bowl having a centrally located upstanding boss on a bottom wall thereof, said spindle extending through said boss, cooperating members on said bowl and platform for registering said bowl in a predetermined locked position relative to said housing, a cover removably attached to said bowl, a motor control switch on said motor housing adjacent the elevation of said cover, and an actuator extending radially outwardly from said cover for actuating said switch.

2. A food processor in accordance with claim 1 including an annular upstanding rim on said platform, said bowl having a depending skirt below said bottom wall and concentric with said rim, said cooperating members on said bowl and platform being on said skirt and rim respectively.

3. A food processor in accordance with claim 2 wherein said platform has a cavity, the upper end of said cavity being defined by said bottom wall on said bowl.

4. A food processor in accordance with claim 1 wherein said housing has air inlet means spaced from air outlet means, said motor having a blower for causing air to flow from said inlet means to said outlet means for cooling the motor when the motor is operative.

5. A food processor in accordance with claim 1 wherein said housing has a motor chamber defined at its upper end by a generally flat wall, the elevation of said flat wall being adjacent the elevation of said cover.

6. A food processor in accordance with claim 1 wherein said housing is molded from a polymer plastic material integral in one piece with said platform, and a bottom wall removably fastened to said open bottom of said housing.

7. A food processor in accordance with claim 1 wherein said platform is provided with an upstanding rim, said bowl being concentric with said rim, arcuate mating surfaces on said rim and bowl for force-fit contact to latch the bowl in a registered position.

8. A food processor comprising a housing having a platform adjacent the lower end thereof, an electrical motor supported in said housing, said motor being above the elevation of said platform, a drive spindle supported by said platform and projecting thereabove, drive means interconnecting said motor with said spindle, a bowl removably supported on said platform alongside the portion of the housing containing said motor, said bowl having a centrally located upstanding boss on a bottom wall thereof, said spindle extending through said boss, cooperating members on said bowl and platform for registering said bowl at a predetermined locked position relative to said housing, a cover removably attached to said bowl, a motor control switch on said motor housing adjacent the elevation of said cover, an actuator radially disposed on said cover for actuating said switch, said motor control switch having an actuator pin located at the bottom of the U-shaped channel on a guard attached to said housing adjacent the upper end thereof, said actuator being a cam which is adapted to project into said channel for contact with said pin, said cam projecting radially outwardly from the periphery of said cover and entering said channel when said bowl and cover are orientated at a locked position for processing food within said bowl.

9. A food processor comprising a housing having a platform, a drive motor in said housing, a drive spindle projecting upwardly from said platform, means interconnecting said motor and spindle for causing the spindle to be driven by said motor, said platform having an annular upstanding rim surrounding said spindle, said platform having an upstanding boss surrounding said spindle radially inwardly from said rim and cooperating with the rim to define a cavity on the upper surface of said platform between said boss and rim, a bowl removably supported on said platform in surrounding relation to said boss, said bowl having a skirt depending below a bottom wall on said bowl, a bayonet slot on said skirt, a circumferentially disposed projection on said rim for cooperation with said bayonet slot for registering said bowl in a latched position, mating elements on said bowl and rim for maintaining the bowl stationery in one rotative direction when said projection is disposed within said bayonet slot, a lid removably attached to said bowl and a motor control switch on said housing, an actuator for said switch on said cover, a safety guard on said housing adjacent a control pin on said switch, said safety guard having a channel for receiving said actuator when said pin is contacted by said actuator.

10. In a food processor comprising a housing, a bowl supported by said housing, a motor supported by said housing and being connected to a blade in said bowl, a removable cover on said bowl, a switch actuator member for controlling operation of said motor, a cam on said cover for starting said motor by way of said member, the improvement comprising said housing having a discrete portion alongside said bowl and extending to an elevation approximating the elevation of the cover on said bowl, a guard defining a U-shaped passage, said guard being supported by said housing adjacent the elevation of said cover and radially outwardly from said cover, said cam being supported by the periphery of said cover at an elevation so that it may enter said passage in one position of the cover, said switch actuator member being on said housing portion and extending in said passage for contact with said cam, and said guard including a wall above said cam when said cam is in said passage to inhibit upward movement of said cover.

11. Apparatus in accordance with claim 10 wherein said passage is horizontally disposed with its bight portion defined by a generally vertically disposed portion of said guard through which said switch actuator member extends.

* * * * *